May 28, 1963   M. L. COURTER ET AL   3,091,622
ETHYLENE OXIDE PRODUCTION
Filed May 24, 1960

INVENTORS:
MARTIN L. COURTER
GEORGE J. CARLSON
BY:
THEIR AGENT

United States Patent Office 3,091,622
Patented May 28, 1963

3,091,622
ETHYLENE OXIDE PRODUCTION
Martin L. Courter, Walnut Creek, and George J. Carlson, Berkeley, Calif., assignors to Shell Oil Company, New York, N.Y., a corporation of Delaware
Filed May 24, 1960, Ser. No. 31,298
3 Claims. (Cl. 260—348.5)

This invention relates to improvements in the production of ethylene oxide by the direct oxidation of ethylene with molecular oxygen in the presence of silver catalysts.

In the catalytic oxidation of ethylene to ethylene oxide with molecular oxygen, particularly when a dilute oxygen-containing gas, such as, for example, air is used as oxygen charge, large volumes of gaseous materials are generally present within the system. Effluence from the reaction zone will contain, in addition to ethylene oxide, a large volume of normally gaseous materials such as unconverted ethylene, oxides of carbon, inert gas, such as nitrogen, paraffinic hydrocarbons, etc. Continuous operation of the process necessitates, in addition to ethylene oxide recovery, the continuous elimination, or venting, of a gaseous stream from the process to maintain the system in balance. In view of the large volumes of normally gaseous materials introduced into the system the amount of gas vented must also be quite considerable. Since the efficient operation of the process is dependent upon the conversion of as much of the ethylene to ethylene oxide as possible, it is essential that the venting of the gas be affected in a manner reducing to a minimum the loss of valuable ethylene as well as of the ethylene oxide product. To convert unconsumed ethylene to additional amounts of ethylene oxide, it has been proposed heretofore to subject such unconsumed ethylene to additional ethylene oxidizing conditions. Efficient operation of an ethylene oxide process is, therefore, dependent upon a high total conversion of ethylene charged to the desired ethylene oxide product. However practicality of the process is additionally governed by other factors, including the cost incurred by operational procedures resorted to in handling the large amount of normally gaseous materials in the reaction and recovery systems.

Heretofore effluence from the primary reaction zone has generally been sent in its entirety through a product recovery zone, usually involving an extraction or scrubbing type of operation. The high rate of product recovery essential to efficient practical scale operation, coupled with the large volume of the effluence from the primary reaction zone in a system using a diluted oxygen charge, often renders difficult and costly the operation of such a product recovery zone.

Figure 2:
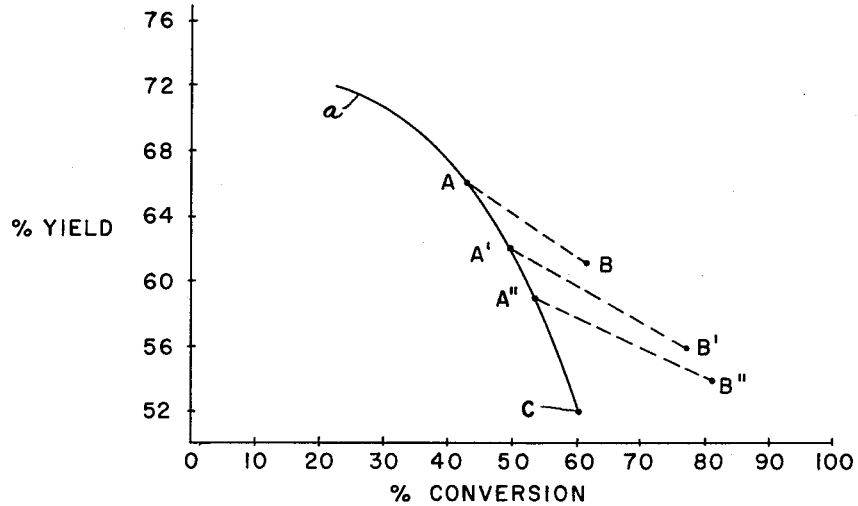
Figure 1:
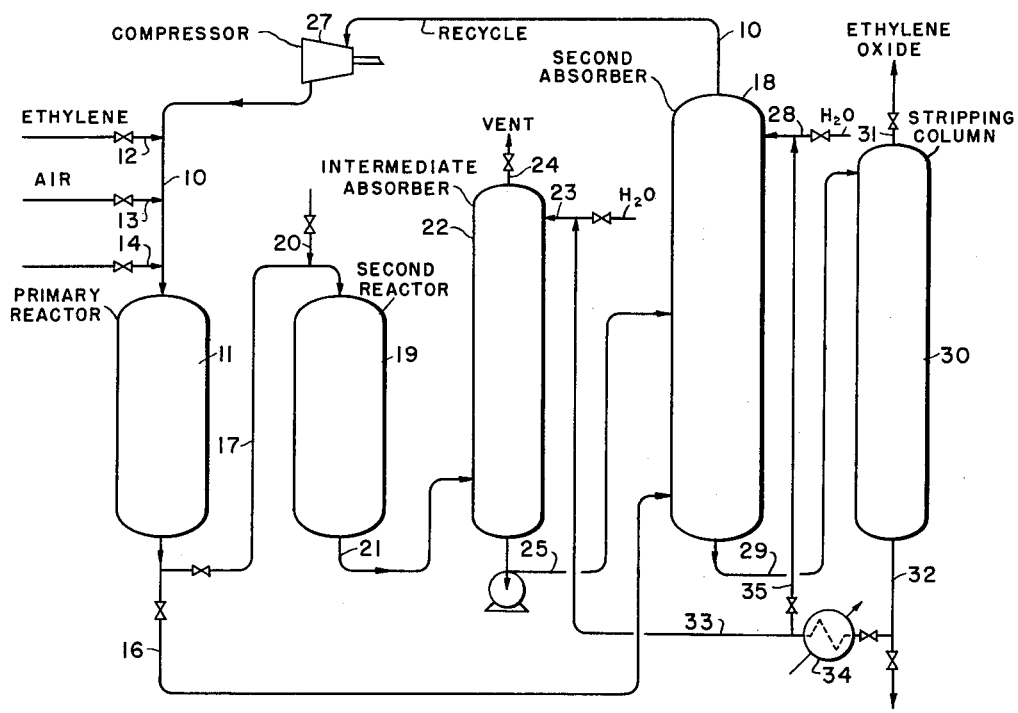

It is, therefore, an object of the present invention to provide an improved process enabling the more efficient production of ethylene oxide by the silver-catalyst oxidation of ethylene wherein the above difficulties are obviated to at least a substantial degree. Another object of the invention is the provision of an improved process enabling the more efficient production of ethylene oxide. with increased yields, by the silver-catalyzed oxidation of ethylene with the use of diluted oxygen, or air, as the source of the oxygen reactant. Other objects and advantages of the present invention will become apparent from the following detailed description thereof made with references to the attached drawings wherein FIGURE 1 represents a more or less diagrammatic elevational view of one form of apparatus suitable for carrying out the process of the invention; and FIGURE 2 shows a graph wherein yields are plotted against conversion for comparative ethylene oxide producing operations.

In accordance with the invention, ethylene is reacted with an oxygen-containing gas, comprising oxygen and an inert normally gaseous diluent, in the presence of a silver catalyst, at ethylene oxide-forming conditions of temperature and pressure, in a plurality of reaction zones; effluence from one, or primary, reaction zone of said plurality of reaction zones is divided into two effluent streams of unequal volume; the larger of said effluent streams is passed directly into a product separating zone; the smaller of said streams is passed directly into a second reaction zone comprised in said plurality of reaction zones; effluence from said second reaction zone is passed into an intermediate product separating zone; ethylene oxide is separated from a normally gaseous fraction in each of said product separating zones; at least a part of the normally gaseous fraction separated in said product separating zone receiving said effluence from said primary reaction zone is recycled to said primary reaction zone; the normally gaseous fraction separated in said intermediate product separating zone is eliminated from the system; and ethylene oxide is withdrawn from said product separating zones.

The invention enables not only a substantial reduction in cost of product separation and recovery, but surprisingly enables the process to be carried out with considerably higher ultimate yields of ethylene oxide than is generally obtained in processes used heretofore wherein dilute oxygen-containing gas, such as air, is relied upon as the source of the oxygen reactant.

Referring to the FIGURE 1 of the drawing, an ethylene-containing recycle stream emanating from within the system through line 10, as described more fully herein below, is introduced into a primary reaction zone comprising, for example, a reactor 11. Ethylene emanating from an outside source is passed through valved line 12 into line 10. Ethylene introduced into the system through valved line 12 need not necessarily be essentially pure ethylene and may comprise normally gaseous diluents which have no substantial adverse effect upon the activity of the catalyst or the course of the reaction. The ethylene so introduced may comprise normally gaseous constituents generally encountered in readily available ethylene, such as, for example, minor amounts of normally gaseous hydrocarbons other than ethylene. A dilute oxygen-containing gas, for example air, emanating from an outside source, is passed through valved line 13 into line 10. Normally gaseous materials, such as, for example, nitrogen, oxides of carbon, etc., as well as steam, may be removed or introduced in varying amounts into line 10 by means not shown in the drawing.

The composiiton of the charge entering reactor 11 through line 10 may vary within the scope of the invention. Ethylene concentrations of from about 2 to about 20% may be employed. The oxygen content of the stream entering reactor 11 may be less than, equal to, or in excess of the amount theoretically required for the oxidation of the ethylene component of the charge to ethylene oxide. In general, the oxygen concentration of the feed entering reactor 11 is maintained in the range of from about 5 to about 20%. It is preferred to maintain the oxygen concentration at or below about 9%, or below the minimum amount capable of forming a flammable mixture at the conditions of operation. Materials other than ethylene and oxygen entering the reactor 12 will generally consist essentially of inert gases, such as, for example, nitrogen, carbon dioxide, water and the like, and a catalyst modifier.

Within reactor 11 the reaction mixture is brought into contact with a silver catalyst. Suitable silver catalysts comprise those disclosed in the prior art as effective in catalyzing the controlled ethylene oxidation to ethylene oxide. Catalysts comprising silver in the form of metallic silver upon a suitable support material are preferred.

The contents of reactor 11 are maintained at a temperature in the range of, for example, from about 150 to about 450° C. and preferably in the range of from about 250 to about 300° C. Pressures in the range of, for example, from about atmospheric to about 500 lb./p.s.i.g. are maintained within reactor 11.

An agent capable of asserting a favorable effect upon the catalytic oxidation reaction is preferably employed. Such agent is introduced into the system from an external source by means of valved line 14. The suitable agents which may be employed are those disclosed in the prior art literature relating the controlled oxidation of ethylene and comprise, for example, halogen-containing compounds, such as the chlorinated hydrocarbons, the polychlorinated-polyphenyls, etc. The agents are generally employed in relatively small amounts. Particularly suitable modifying agents, such as the polychlorinated-polyphenyl compound sold in the industry under the name "Aroclor," are generally effective in amounts less than about 10 p.p.m. of the gas mixture charged.

Under the above conditions, ethylene is converted to reaction products comprising ethylene oxide within reactor 11. The reaction mixture comprising ethylene oxide, unconverted ethylene, molecular oxygen, nitrogen, oxides of carbon, etc., are taken from reactor 11 through valved line 16. The effluent stream leaving reactor 11 through valved line 16 is split into two separate streams of unequal size. One stream comprising, for example, from about 85 to about 90% of the total effluence from reactor 11, is passed through line 16, directly into a product separating zone comprising, for example, an absorber 18.

A smaller stream of effluence from reactor 11, constituting, for example, from about 10 to about 15% of the total effluence from reactor 11, is directed from line 16 through valved line 17, into a second reaction zone comprising, for example, a reactor 19. Within reactor 19, effluence emanating from reactor 11 through line 17, is contacted with a silver-containing catalyst under conditions of temperature and pressure effective to convert additional amounts of ethylene to reaction products comprising ethylene oxide. In the broad concept of the invention the catalyst and the operation conditions of temperature, pressure and contact time maintained within reactor 19 are the same as those set forth hereinabove as maintained within reactor 11.

Although in the above illustrative detailed description of the invention there has been shown but one reactor as constituting the primary reaction zone, it is to be understood that a plurality of such reactors arranged in parallel or series flow may be comprised within the first reaction zone. Similarly, the secondary reaction zone may comprise more than one reactor arranged in series or in parallel flow or may comprise a plurality of reactors and intermediate absorbers in series flow.

In the execution of the process of the invention the same operating conditions are generally maintained in both reaction zones. Different conditions within the above-defined range may be maintained, however, within each reactor. In an embodiment of the invention conditions maintained within each of the reaction zones are chosen within the above defined broad range of permissible temperatures and pressures, in such a manner that a relatively low conversion with a relatively high yield of desired ethylene oxide is obtained in the primary reaction zone, and a relatively high conversion with a relatively low yield of ethylene oxide is obtained in the second reaction zone. These conditions are obtained by control of one or more operating conditions, such as temperature, pressure, contact time, etc. In one method of carrying out the process of the invention a temperature in the range of, for example, from about 250 to about 300° C. and a pressure of from about 75 to 275 p.s.i.g. are maintained in the primary reaction zone comprising reactor 11. Time of contact in the primary reaction zone is preferably controlled so that conversion in the range of, for example, from about 30 to about 45% is obtained therein. In the secondary reaction zone, comprising reactor 19, the temperature is preferably maintained in the range of from about 260 to about 325° C. and the pressure in the range of from about 100 to about 150 p.s.i.g. Time of contact is preferably controlled within the secondary reaction zone to obtain a conversion therein of ethylene to ethylene oxide-containing reaction products of from about 75 to about 85%. Optimum results in terms of yields and efficiency of operation are generally obtained by maintaining a somewhat higher temperature and a lower pressure in the second reaction zone than in the primary reaction zone.

Modifying agents, such as introduced into reactor 11 through lines 14 and 10, may be introduced into reactor 19 through valved line 20 leading into line 17. In a preferred embodiment of the invention introduction of modifying agents into the system through valved lines 14 and 20 from an outside source is employed to aid in controlling optimum conditions within each of the reactors. Thus, the modifying agents may be introduced into only one or into both of the reaction zones. Different modifying agents may be introduced into each of the reactors. Thus, a halogenated hydrocarbon, such as ethylene dichloride, may be introduced into the primary reactor 11, while a modifying agent of differing characteristics, such as, for example, a polychlorinated polyphenyl compound, is introduced into the secondary reactor 19. The type of modifying agent so added, and the amount is correlated with operating conditions of temperature, pressure, and time of contact in each of the reaction zones to attain the desired conditions therein.

Effluence from the second reactor 19 is passed through line 21 into a separate, intermediate, product separating zone, for example, a first absorber 22. Within the intermediate absorber 22 effluence from reactor 19 is brought into countercurrent contact with a selective solvent for ethylene oxide, such as, for example, water introduced into the upper part of column 22 through valved line 23. Normally gaseous materials, now containing no more than a trace of ethylene oxide, are passed overhead from the intermediate absorber 22 through valve line 24, and eliminated from the system. Rich absorbate consisting essentially of ethylene oxide and water is forced from the intermediate absorber 22, through line 25 into second absorber column 18. At least a part of the stream flowing through line 25 may be passed directly into line 29 if desired.

Within second absorber column 18, the effluent stream emanating thereto through line 16 from reactor 11 is brought into contercurrent contact with a countercurrently flowing stream of normally liquid solvent capable of selectively removing ethylene oxide from the reactor effluence. Suitable solvents comprise, for example, water, introduced into the upper part of column 18 through valved line 28. The rich aqueous absorbate emanating to column 18 from column 22 through line 25 is preferably introduced into column 22 at a point thereof between the points of introduction of the contents of lines 16 and 28, respectively. The aqueous stream from line 25 entering column 18 at an intermediate point thereof will function as auxiliary solvent for the ethylene oxide content of the stream entering column 22 through line 21.

It is seen that in the process of the invention the amount of reaction products introduced into the intermediate absorber column (22), from which the vent stream is taken from the system, is reduced to a minimum. A signal advantage of the process resides in the ability to operate the intermediate absorber 22 with a substantial excess of solvent water since such excess water functions as auxiliary solvent for the effluent stream from reactor 11 passing to column 18.

The absence of any substantial amount of ethylene oxide in material vented from the system (line 24) is, therefore, assured with a minimum total absorbate requirement, and with a high degree of flexibility with respect to maintenance of optimum operating conditions within the absorption zones.

The rich absorbate consisting essentially of ethylene oxide and water, and containing substantially all of the ethylene oxide comprised in the effluent streams from reactors 11 and 19, is passed from absorber column 18, through line 29, into a suitable product separating zone comprising, for example, stripping column 30. In stripping column 30 ethylene oxide is separated as a vapor fraction from aqueous solvent and eliminated from the system as final product through valved line 31. Lean aqueous solvent is passed from stripping column 30, through valved line 32. At least a part of the lean aqueous absorbate may be passed from valved line 32, through line 33, provided with suitable cooling means, for example, heat exchanger 34, into line 23 leading into the upper part of column 22. A part or all the lean absorbate passing through line 33 may be by-passed through line 35 into valved line 28 leading into the upper part of column 18. Make-up water is introduced into the system from an outside source as required through valved line 28 or 23, or both.

Normally gaseous materials consisting essentially of unconverted ethylene, nitrogen, oxides of carbon, paraffinic hydrocarbons, etc., now free of any substantial amount of ethylene oxide, separated in absorber column 18 is removed overhead therefrom through line 10 and recycled, preferably through suitable pumping means, such as, for example, compressor 27, to the primary reaction zone comprising reactor 11.

It is seen that in the process of the invention a part of the effluence from primary reactor 11 is passed into the second reactor 19 without the removal of components therefrom, and without the addition of charge materials, such as oxygen and/or ethylene, thereto. Normally gaseous materials vented from the system are taken in their entirety only from intermediate absorber 22, whereas material recycled to the primary reactor emanates solely from the second absorber 18.

EXAMPLE I

The reference numbers in parenthesis used in the present example have reference to parts of apparatus in FIGURE 1 of the attached drawing similarly numbered.

Ethylene oxide was produced by the silver-catalyzed oxidation of ethylene with air in a continuous recycle operation comprising the use of a single reactor (11), a single absorber (18) and a stripper (30). To a recycle stream (10) emanating from the absorber (18) as described herein, there is added make-up air and ethylene from an outside source to result in a normally gaseous reactor charge consisting essentially of 3% ethylene and 9.5% oxygen (introduced as air), by volume; the rest of the reactor charge consisted essentially of nitrogen, carbon dioxide, carbon monoxide, and a minor amount of normally gaseous hydrocarbons other than ethylene. The reactor charge was introduced as a continuous stream into the reactor (11). A trace of polychlorinated diphenyl is added to the charge. Within the reactor (11) the normally gaseous charge is contacted with a catalyst consisting essentially of silver on a silica-alumina support (Alundum), at a temperature of 268° C., a pressure of 115 p.s.i.g., and a contact time of 8 seconds. The total effluent stream from the reactor (11) is passed into the absorber (18) wherein it is scrubbed with water, thereby selectively absorbing oxidation products including ethylene oxide in the water leaving a normally gaseous fraction consisting essentially of nitrogen, carbon dioxide, carbon monoxide, ethylene, oxygen, a minor amount of normally gaseous paraffinic hydrocarbons and entrained ethylene oxide. The normally gaseous fraction is recycled from the absorber (18 through line 10) to the reactor (11). The rich aqueous absorbate consisting essentially of water and absorbed ethylene oxide is passed from the absorber (18) into the stripper (30) wherein ethylene oxide is stripped overhead therefrom as a final product (31). In this operation sufficient amount of the recycle stream was bled from the system (from line 10 by means not shown in the drawing) to maintain the system in balance. A conversion of 43% of the ethylene charged to the system, with a yield of ethylene oxide of 66%, based upon ethylene converted was obtained. The actual overall yield of ethylene oxide, after compensation for ethylene lost in the bleed from the system was 56%.

The operation was repeated in three additional operations, identified herein as runs A', A'' and C, respectively, under substantially identical conditions as the run A, but with the exception that the reaction temperature was varied. Runs A', A'' and C were carried out with a reactor temperature of 281°, 284°, and 300° C., respectively. The results obtained in terms of conversion and yield are set forth in the following Table I.

In the FIGURE 2 of the attached drawing yields are plotted against conversions for each of the four operations, runs A, A', A'' and C, to give the curve "a" indicated by solid line.

In three separate operations, identified herein as operations B, B' and B'', ethylene oxide was produced in accordance with the presently claimed invention. Operational procedure of runs B, B' and B'' differs from that employed in foregoing operations A, A' and A'', respectively, to the extent that a second and separate reactor (19) receiving a small portion of the total effluence from the first reactor (11), and an intermediate absorber (22) receiving the total effluence from the second reactor (19), are added to the system; and in that the gaseous overhead from the added intermediate absorber (22) now constitutes the sole bleed eliminated from the system.

In the operation run B, make-up air and ethylene are added to the recycle stream emanating from the main absorber (18) to result in a normally gaseous reactor charge consisting essentially of 3% ethylene and 9.5% oxygen (introduced as air); the rest of the reactor charge consisting essentially of nitrogen, carbon dioxide, carbon monoxide, and a small amount of normally gaseous hydrocarbons other than ethylene. The reactor charge is introduced as a continuous stream into the primary reactor (11). A trace of polychlorinated diphenyl is added to the charge. Within reactor (11) the normally gaseous charge is subjected to contact with a separate portion of the same silver-on-Alundum catalyst used in the foregoing operations, at a temperature of 268° C., a pressure of 115 p.s.i.g. and a contact time of 8 seconds. The total effluence from the primary reactor (11) is divided into two streams of unequal volume. The smaller comprising 15% of the total effluent from the primary reactor (11); the larger stream comprising the other 85%. The smaller effluent stream is passed (through line 17) into the second reactor (19) wherein it is contacted with a separate portion of the same silver-on-Alundum catalyst used in the primary reactor, at a temperature of 268° C., a pressure of about 115 p.s.i.g. and a contact time of 8 seconds. The total effluence from the second reactor (19) is passed into the intermediate absorber (22) wherein it is scrubbed with sufficient liquid water to absorb substantially all of the ethylene oxide, leaving a gaseous fraction consisting essentially of oxides of carbon, nitrogen and a smaller amount of normally gaseous materials comprising normally gaseous hydrocarbons and containing no more than a trace of ethylene oxide. The gaseous fraction separated in the intermediate absorber (22) is removed overhead therefrom and eliminated from the system (24). The larger effluent stream from the primary reactor (11) is passed directly (through line 16) into the main absorber (18). The rich aqueous absorbate consisting essentially of water and oxidation products comprising ethylene oxide separated in the intermediate absorber (22) is introduced into the main absorber (18) at an intermediate point thereof. Water is introduced as additional solvent into the top of the main absorber (18). Within the main absorber (18) ethylene oxide is absorbed in water leaving a gaseous fraction consisting essentially of nitrogen, oxides of carbon, ethylene, oxygen, and a minor amount of paraffinic hydrocarbons. The gaseous fraction is removed overhead from the main absorber (18) and passed in its entirety as the recycle stream to the first reactor (11). The rich aqueous absorbate is taken from the main absorber (18) and passed into a stripper (30) wherein ethylene oxide is distilled therefrom as overhead product. In this operation B, there was obtained a conversion of ethylene charged of 61%, with an ethylene oxide yield of 61%. The overall yield of ethylene oxide obtained when compensating for ethylene lost in the bleed was 58.5%.

In two separate operations runs B' and B'', the foregoing operation, run B, was repeated under substantially identical conditions but with the exception that a reaction temperature of 281° was maintained in both reactors in run B', and a reaction temperature of 284° in both reactors of run B''. Runs B, B' and B'' are truly comparative with the foregoing runs A, A', A'', respectively.

Results obtained in the foregoing operations in terms of conversion and yield are set forth in the following Table I and are indicated by points B, B' and B'' in the FIGURE 2 of the attached drawing:

Table I

| Temperature, °C. | Run | Conversion Percent | Yield, Percent | Overall Yield, Percent |
| --- | --- | --- | --- | --- |
| 268 | A | 43 | 66 | 56 |
| 268 | B | 61 | 61 | [1] 58.5 |
| 281 | A' | 50 | 62 | |
| 281 | B' | 77 | 56 | |
| 284 | A'' | 52 | 58 | |
| 284 | B'' | 82 | 54 | |
| 300 | C | 60 | 52 | 45 |

[1] The operation run B, carried out in accordance with the process of the invention, decreased the throughput through the main absorber (18) by 12.5% compared to operation run A.

It is seen that the process of the invention enables the attainment of higher conversions at lower temperatures than are attained by prior art procedure even at much higher temperatures. Thus, at 268° C. the process of the invention enables the attainment of a conversion of 61% and an overall yield of 58% (run B) as compared to prior art procedure attaining only 60% conversion and 45% overall yield at the substantially higher temperature of 300° C. The process in accordance with the invention furthermore has the signal advantage of avoiding the need to pass through the main absorption system either the charge to the second reactor or the gaseous material which must be vented from the system.

For the purpose of simplicity all parts of apparatus such as pumps, condensers, valves, coolers, heat exchangers, accumulators, etc., not essential to a complete understanding of the invention have been omitted from the detailed illustrative description and drawing.

We claim as our invention:

1. In the process for the production of ethylene oxide wherein ethylene is reacted with air at ethylene oxide-forming conditions in the presence of a silver catalyst, at a temperature of from about 150° to about 450° C. in a reaction system comprising a plurality of reaction zones, the combination of steps consisting essentially of dividing the effluence from the first reaction zone in said reaction system into two separate effluent streams of unequal volume, the smaller of said effluent streams comprising from about 10 to about 15% by volume of the total effluence from said first reaction zone, passing the larger of said effluent streams into a primary absorption zone, passing the smaller of said effluent streams into the second reaction zone of said reaction system, passing effluence from said second reaction zone into a separate intermediate absorption zone, selectively absorbing ethylene oxide in water in each of said absorption zones, thereby separating a normally gaseous phase comprising nitrogen, oxides of carbon and unconverted ethylene from a liquid phase comprising water and ethylene oxide in each of said absorption zones, passing said normally gaseous phase separated in said primary absorption zone into said first reaction zone, eliminating said gaseous phase separated in said intermediate absorption zone from the system, passing at least a part of said liquid phase formed in said intermediate absorption zone as auxiliary solvent into said primary absorption zone and distilling ethylene oxide from said liquid phase formed in said primary absorption zone.

2. In the process for the production of ethylene oxide wherein ethylene is reacted with air at ethylene oxide-forming conditions in the presence of a silver catalyst at a temperature of from about 250° to about 325° C. in a reaction system comprising a plurality of reaction zones, the combination of steps consisting essentially of dividing the total effluence from the first reaction zone in said reaction system into two separate effluent streams of unequal volume, the smaller of said effluent streams comprising from about 10% to about 15% of the total effluence from said first reaction zone, passing said smaller effluent stream into a separate second reaction zone of said reaction system, passing said larger effluent stream from said first reaction zone into a primary absorption zone, passing the total effluence from said second reaction zone into a separate intermediate absorption zone, selectively absorbing ethylene oxide in water in each of said absorption zones, thereby separating a normally gaseous phase comprising nitrogen, oxides of carbon and unconverted ethylene from a liquid phase comprising water and ethylene oxide in each of said absorption zones, passing said normally gaseous phase separated in said primary absorption zone into said first reaction zone, eliminating said gaseous phase separated in said intermediate absorption zone from the system, and distilling ethylene oxide from said liquid phase formed in said primary absorption zone.

3. In the process for the production of ethylene oxide wherein ethylene is reacted with air at ethylene oxide-forming conditions in the presence of a silver catalyst in a reaction system comprising a plurality of reaction zones, the combination of steps which comprises separating the total effluence from the first reaction zone in said reaction system into two separate effluent streams of unequal volume, the smaller of said effluent streams comprising from about 10% to about 15% of the total effluence from said first reaction zone, passing said smaller effluent stream into a separate second reaction zone of said reaction system, maintaining a temperature of from about 250° to about 300° C. in said first reaction zone and a temperature of from about 260° to about 325° C. in said second reaction zone, passing said larger effluent stream from said first reaction zone into a primary absorption zone, passing the total effluence from said second reaction zone into a separate intermediate absorption zone, selectively absorbing ethylene oxide in water in each of said absorption zones, thereby separating a gaseous phase comprising nitrogen, oxides of carbon and unconverted ethylene from a liquid phase comprising water and ethylene oxide in each of said absorption zones, passing said normally gaseous phase separated in said primary absorption zone into said first reaction zone, eliminating said gaseous phase separated in said intermediate absorption zone from the system, passing at least a part of said liquid phase formed in said intermediate absorption zone as auxiliary absorbent into said primary absorption zone, and distilling ethylene oxide from said liquid phase separated in said primary absorption zone.

References Cited in the file of this patent

UNITED STATES PATENTS 2,437,930    Bergsteinsson et al. _____ Mar. 16, 1948
2,693,474    Egbert _____ Nov. 2, 1954
2,777,862    Egbert _____ Jan. 15, 1957

FOREIGN PATENTS 523,415    Canada _____ Apr. 3, 1956
580,849    Canada _____ Aug. 4, 1959